(12) United States Patent
Pennington et al.

(10) Patent No.: US 10,271,519 B2
(45) Date of Patent: Apr. 30, 2019

(54) PET TOY CASTER

(71) Applicants: Terry Pennington, Locust, NC (US);
Carrie Pennington, Locust, NC (US)

(72) Inventors: Terry Pennington, Locust, NC (US);
Carrie Pennington, Locust, NC (US)

( * ) Notice: Subject to any disclaimer, the term of this patent is extended or adjusted under 35 U.S.C. 154(b) by 248 days.

(21) Appl. No.: 15/364,798

(22) Filed: Nov. 30, 2016

(65) Prior Publication Data

US 2018/0146643 A1 May 31, 2018

(51) Int. Cl.
*A01K 29/00* (2006.01)
*A01K 15/02* (2006.01)
*B65H 57/06* (2006.01)
*B65H 75/40* (2006.01)
*B65H 75/42* (2006.01)

(52) U.S. Cl.
CPC ............ *A01K 15/025* (2013.01); *B65H 57/06* (2013.01); *B65H 75/406* (2013.01); *B65H 75/42* (2013.01); *B65H 2701/35* (2013.01)

(58) Field of Classification Search
CPC .............................. A01K 15/025; A01K 15/02
USPC .... 119/708, 707, 702, 709, 710, 711; 43/24, 43/18.1 R
See application file for complete search history.

(56) References Cited

U.S. PATENT DOCUMENTS

| | | | | | |
|---|---|---|---|---|---|
| 3,727,583 | A * | 4/1973 | Muraro | ................. | A01K 15/025 119/707 |
| 4,803,953 | A * | 2/1989 | Graves | ................. | A01K 15/025 119/707 |
| 5,467,740 | A * | 11/1995 | Redwine | ............... | A01K 15/025 119/707 |
| 5,713,307 | A * | 2/1998 | Polston | ................ | A01K 15/026 119/708 |
| 5,743,215 | A * | 4/1998 | Zeff | ...................... | A01K 15/025 119/707 |
| 5,947,790 | A * | 9/1999 | Gordon | ................ | A01K 15/025 446/247 |
| 6,266,913 | B1 * | 7/2001 | Akiba | .................. | A01K 87/005 43/18.1 R |
| 6,314,913 | B1 * | 11/2001 | Lettau | .................. | A01K 15/025 119/702 |
| 8,997,695 | B2 | 4/2015 | Riding | | |
| 2003/0154927 | A1 * | 8/2003 | Werde | .................. | A01K 15/025 119/707 |
| 2004/0244718 | A1 | 12/2004 | Dokken | | |
| 2005/0150468 | A1 | 7/2005 | Fleischhacker | | |
| 2006/0162672 | A1 | 7/2006 | Dokken | | |
| 2007/0022972 | A1 * | 2/2007 | Morrison | ............. | A01K 15/025 119/707 |
| 2007/0215063 | A1 * | 9/2007 | Simpson | ............. | A01K 15/025 119/708 |

(Continued)

*Primary Examiner* — Trinh T Nguyen
(74) *Attorney, Agent, or Firm* — Jeffrey C. Watson; Matthew L. Grell; Grell & Watson Patent Attorneys LLC

(57) ABSTRACT

A pet toy caster includes a rod, a reel, a line, and a pet toy. The rod has a butt end and a tip end. The reel is mounted upon the rod near the butt end and is configured for casting and reeling the line. A plurality of guides is securely attached and spaced there along the rod. The plurality of guides including at least a butt guide approximate the reel, and a tip top guide at the tip end. The line is wound about the reel and extended through each of the plurality of guides. The line includes a braided section at a distal end of the line. The pet toy is removably connected to the braided section at the distal end of the line.

17 Claims, 3 Drawing Sheets

(56) References Cited

U.S. PATENT DOCUMENTS

2009/0056641 A1* 3/2009 Freeman .............. A01K 15/025
                                                    119/707
2011/0289818 A1* 12/2011 Hannon ................ A01K 87/04
                                                     43/24

* cited by examiner

PET TOY CASTER

BACKGROUND OF THE DISCLOSURE

Technical Field of the Disclosure

The instant disclosure generally relates to toys for pets, like dog toys, cat toys, toys for other small animals, the like, etc. for playing, entertaining, exercising and/or therapy for the pets and/or the owners. More particularly, the instant disclosure relates to a pet toy caster.

Description of the Related Art

The use of toys or playthings for a pet, like a dog or a cat, the like, or other small pet animals, is known in the prior art. As such, toys or playthings for pets, like dogs or cats, heretofore devised and utilized are known to consist basically of familiar, expected and obvious structural configurations, notwithstanding the myriad of designs encompassed by the crowded prior art which have been developed for the fulfillment of countless objectives and requirements.

Toys and exercise devices for domestic animals employing a casting toy or fishing rod-like configuration are known. U.S. Pat. No. 5,467,740 to Redwine shows a pole and reel assembly with a target preferably in the form of a fluffy ball. U.S. Pat. No. 4,499,855 to Galkiewicz shows a rod with a cord where a soft ball, brightly colored ribbon or a soft sculptured mouse is attached. Other animal toys using rods have been described in U.S. Pat. No. 4,712,510 to Tae-Ho and U.S. Pat. No. 2,307,905 to Ament. U.S. Pat. No. 5,743,215 shows a cat toy for triggering play or attack behavior where the toy is a spring-like device capable of motion in and of itself without movement of the line or whip. U.S. Pat. No. 6,314,913 discloses a reelable cat toy with a compartment for storable lures. U.S. Pat. No. 8,997,695 discloses a casting pet toy with a stretchable cord.

One problem that has been discovered with previous casting pet toys is that the line is not easily seen by the pet. As a result, the pet, like a dog or cat, or other small animal, has a hard time following the toy when casted. In addition, the pet can easily be tripped or become tangled in the casted line when retrieving the toy and/or playing with the toy once retrieved.

Another problem that has been discovered with previous casting pet toys is that the rod and/or line of the caster is not designed to be reeled back in with the pet, like for a tug of war type of game with a dog or cat. In other words, currently known casting pet toys use rods and/or lines that are not durable enough for playing with pets and are thus easily broken. As a result, known casting pet toys do not last very long and must be replaced, thereby adding to costs and downtime.

Yet another problem that has been discovered with previously known pet toy casters is that the toys are not easily changeable. As a result, the casting pet toy requires a lot of downtime to change and/or replace the pet toys.

The instant disclosure of a pet toy caster is designed to address at least some aspects of the problems discussed above.

SUMMARY

Briefly described, in a possibly preferred embodiment, the present disclosure overcomes the above-mentioned disadvantages and meets the recognized need for such a device by providing a pet toy caster.

A pet toy caster, according to select embodiments of the instant disclosure, may include a rod, a reel, a line, and a pet toy. The rod may have a butt end and a tip end. The reel may be mounted upon the rod near the butt end and may be configured for casting and reeling the line. A plurality of guides may be securely attached and spaced there along the rod. The plurality of guides may include at least a butt guide approximate the reel, and a tip top guide at the tip end. The line may be wound about the reel and extended through each of the plurality of guides. The line may include a braided section at a distal end of the line. The pet toy may be removably connected to the braided section at the distal end of the line.

One feature of the instant disclosure may be that the braided section may have a thickness and a length being configured to be visible to the pet, like a dog or cat. In select embodiments, the thickness of the braided section may be at least 0.5 inches thick. In other possibly preferred embodiments, the thickness may be at least 1.0 inches thick. In select embodiments, the length of the braided section may be at least 10 inches long. In other possibly preferred embodiments, the length of the braided section may be between 24 inches to 30 inches long.

Another feature of the instant disclosure may be that the braided section may be at least 3 strands of line interlaced together at the distal end of the line. In select embodiments, the line may include a ring or knot positioned on the line prior to the braided section for starting the braided section. In select embodiments, the braided section may be at least 100 strands of the line interlaced together at the distal end of the line.

Another feature of the instant disclosure of a pet toy caster may be the inclusion of a line stop. The line stop may be configured to prevent the braided section of the line to be reeled into the reel while allowing the line to freely pass through the line stop. The line stop may include a hole or a slot positioned around the line and configured to prevent the braided section of the line to be reeled into the reel while allowing the line to freely pass through the line stop. In select embodiments, the line stop may be a molded line stop molded on the rod approximate the reel. In other select embodiments, the line stop may be a wrapped line stop being wrapped around the rod approximate the reel.

Another feature of the instant disclosure of a pet toy caster may be that the plurality of guides on the rod grow in size from the butt guide to the tip top guide. This growth in size of the guides may allow for casting and reeling of the braided section. In select embodiments, the plurality of guides may be equally spaced along the rod. As an example, and clearly not limited thereto, the guides may include the butt guide having a diameter of approximately or equal to inch, a middle guide having a diameter of approximately or equal to 1 inch, and the tip top guide having a diameter of approximately or equal to 1 and ¼ inches.

Another feature of the instant disclosure of a pet toy caster may be that the rod may be a reinforced rod. The reinforced rod may include a layer of reinforcing material on the outside surface of the rod.

Another feature of the instant disclosure of a pet toy caster may be that the pet toy may be removably connected to the braided section at the distal end of the line. In select embodiments, the pet toy may be removably connected via quick connectors. The quick connectors may include a male quick connection attached to the end of the braided section of the line and a female quick connection attached to the pet toy, or vice versa. The quick connectors may allow for the pet toy to be interchangeable. In select embodiments, the quick connectors may have a release strength less than a test of the line. As a result, one feature may be that the quick connectors may be configured to release the toy prior to breaking the line and/or rod.

Another feature of the instant disclosure may the inclusion of a connector keeper. The connector keeper may be positioned on or approximate the butt end of the rod, like on the handle. The connector keeper may include a spare male quick connection and a spare female quick connection. The connector keeper may include a hole with a ring clasp positioned therethrough with the spare male and female quick connections positioned thereon the ring clasp via slots in the male and female quick connections. As a result, in select embodiments, the spare female quick connection may be configured to connect to the male quick connection on the braided section of the line and the spare male quick connection may be configured to connect to the female quick connection on the pet toy, or vice versa, like for storage. In other select embodiments, the spare female quick connection and the spare male quick connection may be replacement parts for the female quick connection and the male quick connection.

In select embodiments of the instant disclosure of a pet toy caster, a swivel may be included. The swivel may be positioned between the braided section and the pet toy. The swivel may be for allowing free rotation of the pet toy about the line.

In other select embodiments of the instant disclosure of a pet toy caster, a cover may be included on the line. The cover may be positioned on the line between the swivel and the pet toy. The cover may be for protecting the line close to the pet toy.

In other select embodiments of the instant disclosure of a pet toy caster, the reel may include a spool that is rotatably disposed in the reel. A lever may be connected to the spool for turning the spool for reeling the line in. A release mechanism may be engageable to the spool for releasing the spool for casting.

In other select embodiments of the instant disclosure of a pet toy caster, a handle may be included. The handle may be securely disposed at the butt end of the rod.

In another aspect, the pet toy caster of the instant disclosure may include a rod, a reel, a line, and a pet toy. The rod may have a butt end and a tip end. The reel may be mounted upon the rod near the butt end and may be configured for casting and reeling the line. A plurality of guides may be securely attached and spaced therealong the rod. The plurality of guides may include at least a butt guide approximate the reel, and a tip top guide at the tip end. The line may be wound about the reel and may extend through each of the plurality of guides. The plurality of guides on the rod may grow in size from the butt guide to the tip top guide. This growth in size from the butt guide to the tip top guide may allow for casting and reeling of a braided section of the line.

In select embodiments of this aspect of the instant disclosure of a pet toy caster, the plurality of guides may be equally spaced along the rod.

As examples of this aspect of the instant disclosure of a pet toy caster, the plurality of guides may include the butt guide which may have a diameter of approximately or equal to ½ inch, a middle guide which may have a diameter of approximately or equal to 1 inch, and the tip top guide which may have a diameter of approximately or equal to 1 and ¼ inches.

In another aspect, the pet toy caster of the instant disclosure may include a rod, a reel, a line, and a pet toy. The rod may have a butt end and a tip end. The reel may be mounted upon the rod near the butt end and may be configured for casting and reeling a line. The plurality of guides may be securely attached and spaced therealong the rod. The plurality of guides may include at least a butt guide approximate the reel, and a tip top guide at the tip end. The line may be wound about the reel and may extend through each of the plurality of guides. The pet toy may be removably connected to the braided section of the line via quick connectors. The quick connectors may include a male quick connection attached to the end of the line and a female quick connection attached to the pet toy, or vice versa. Whereby, the quick connectors may allow for the pet toy to be interchangeable.

In select embodiments of this aspect of the instant disclosure of a pet toy caster, the quick connectors may have a release strength less than a test of the line and/or strength of the rod. As a result, the quick connectors may be configured to release the toy prior to breaking the line and/or rod.

In select embodiments of this aspect of the instant disclosure of a pet toy caster, the butt end of the rod may include a connector keeper. The connector keeper may include a spare male quick connection and a spare female quick connection. The connector keeper may include a hole with a ring clasp positioned therethrough with the spare male and female quick connections positioned thereon the ring clasp via slots in the male and female quick connections. In select embodiments, the spare female quick connection may be configured to connect to the male quick connection on the braided section of the line and the spare male quick connection may be configured to connect to the female quick connection on the pet toy, or vice versa, for storage. In other select embodiments, the spare female quick connection and the spare male quick connection may be replacement parts for the female quick connection and the male quick connection.

BRIEF DESCRIPTION OF THE DRAWINGS

The present apparatuses, systems and methods will be better understood by reading the Detailed Description with reference to the accompanying drawings, which are not necessarily drawn to scale, and in which like reference numerals denote similar structure and refer to like elements throughout, and in which.

It is to be noted that the drawings presented are intended solely for the purpose of illustration and that they are, therefore, neither desired nor intended to limit the disclosure to any or all of the exact details of construction shown, except insofar as they may be deemed essential to the claimed disclosure.

DETAILED DESCRIPTION

Figure 1:
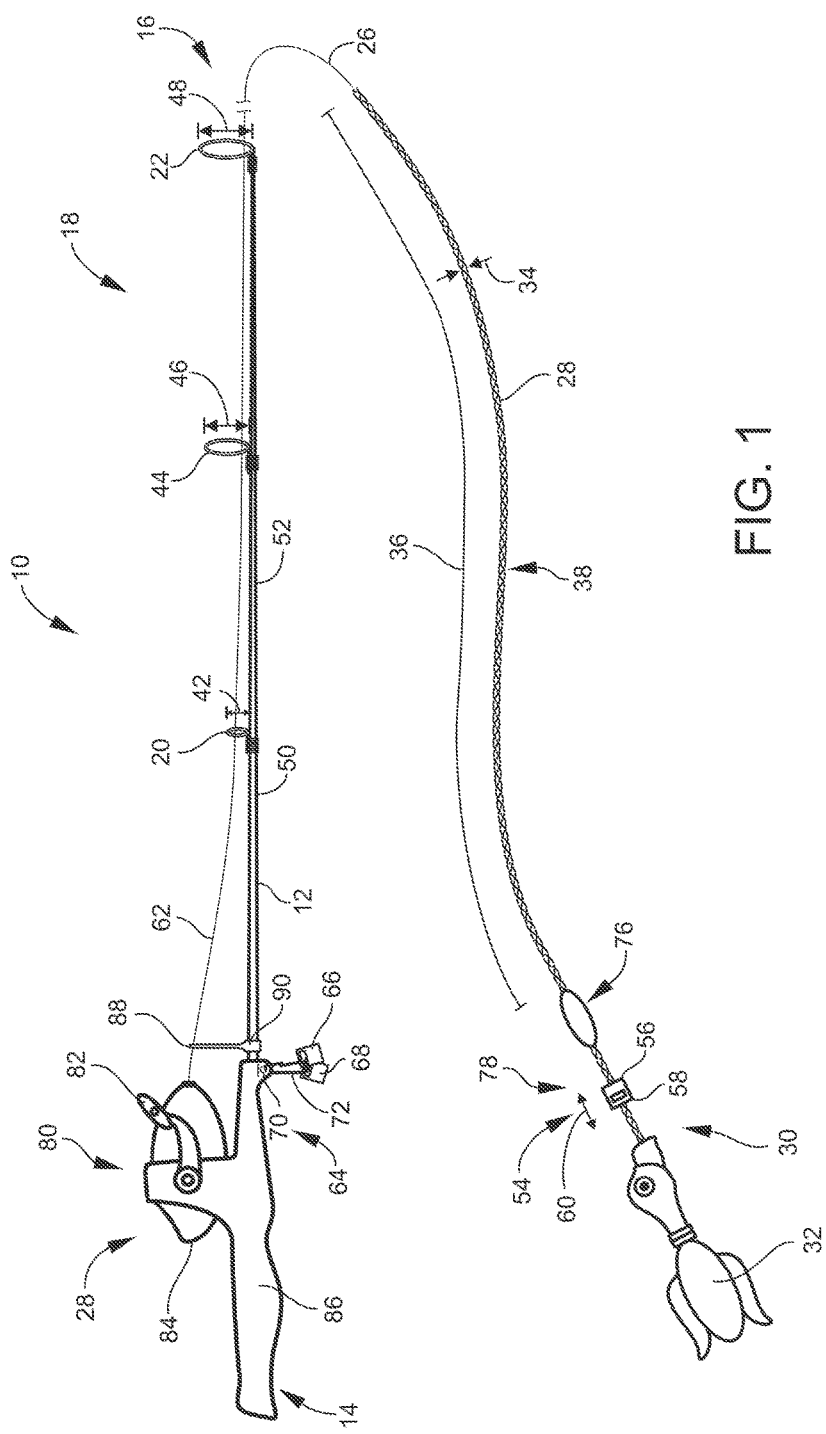
FIG. 1 is a schematic side view of the pet toy caster according to select embodiments of the instant disclosure.
Figure 2:
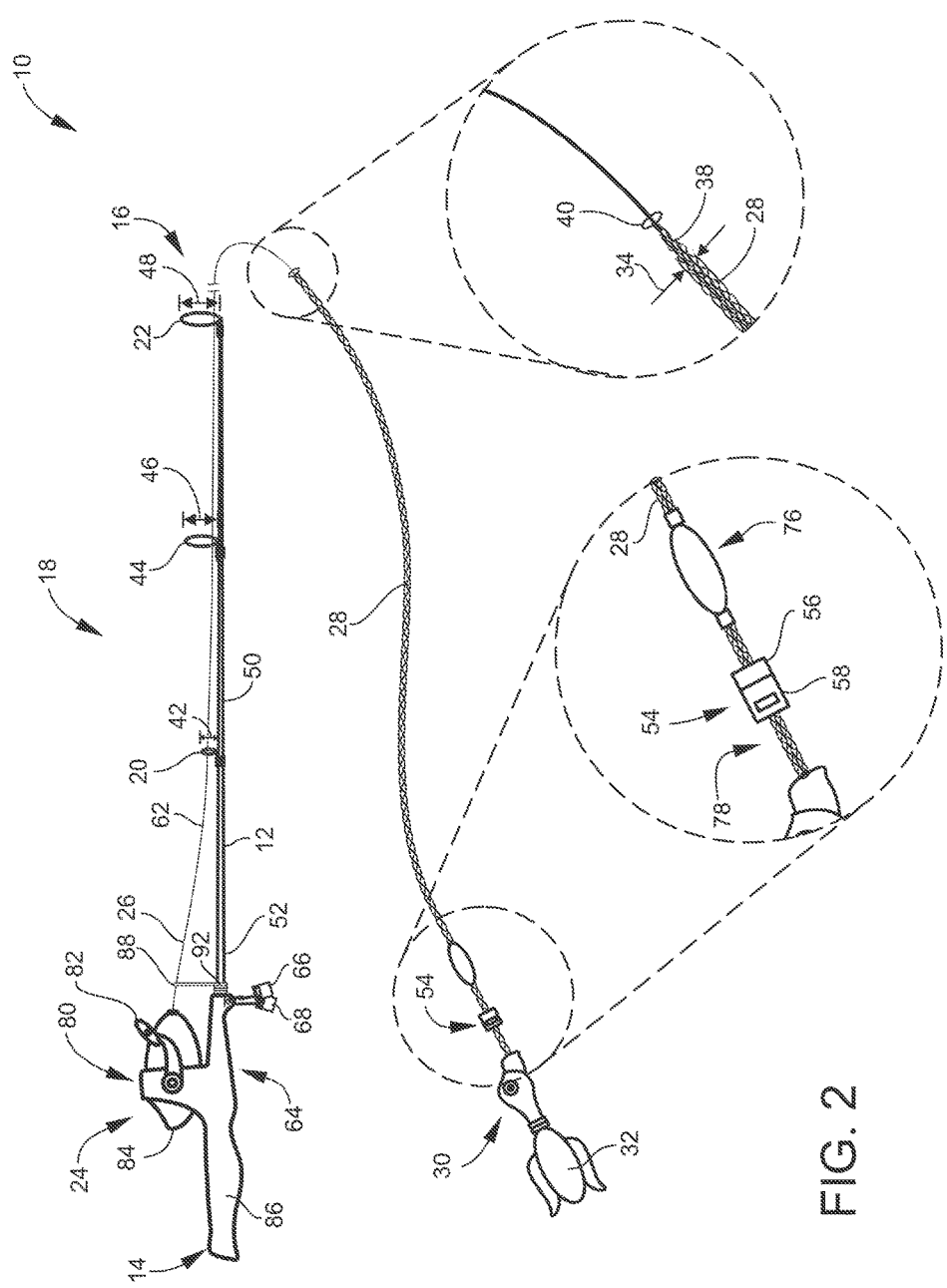
FIG. 2 is another schematic side view of the pet toy caster according to select embodiments of the instant disclosure with zoomed in views of the braided line and quick connectors.
Figure 3:
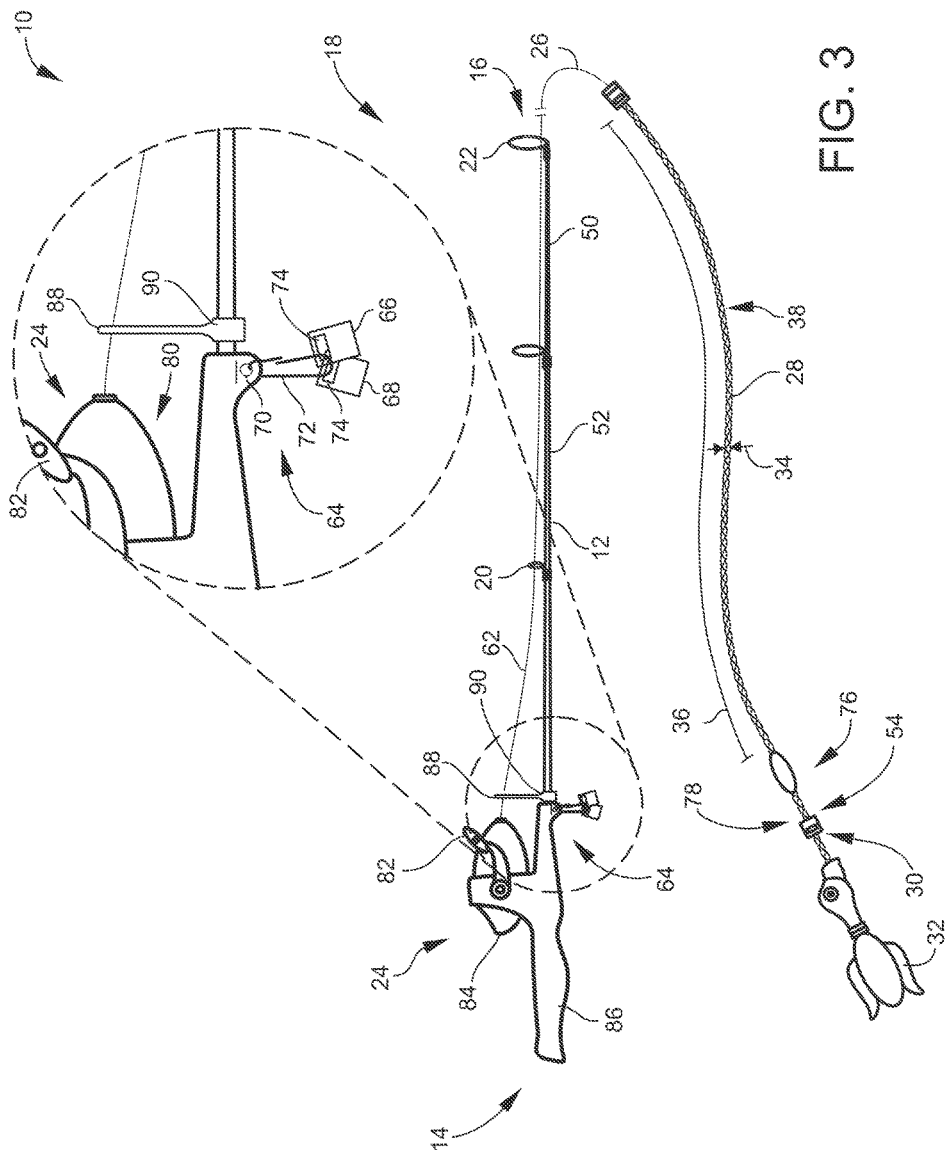
FIG. 3 is another schematic side view of the pet toy caster according to select embodiments of the instant disclosure with a zoomed in view of the line stop and spare quick connectors.

In describing the exemplary embodiments of the present disclosure, as illustrated in FIGS. 1-3, specific terminology is employed for the sake of clarity. The present disclosure, however, is not intended to be limited to the specific terminology so selected, and it is to be understood that each specific element includes all technical equivalents that operate in a similar manner to accomplish similar functions. Embodiments of the claims may, however, be embodied in many different forms and should not be construed to be limited to the embodiments set forth herein. The examples set forth herein are non-limiting examples, and are merely examples among other possible examples.

Referring now to FIGS. 1-3 by way of example, and not limitation, therein is illustrated example embodiments of pet toy caster 10. Pet toy caster 10 may be for providing a casting toys for pets, like dogs, cats, toys for other small animals, the like, etc. for playing, entertaining, exercising and/or therapy for the pets and/or their owners. In general, pet toy caster 10 may include rod 12, reel 24, line 26, and pet toy 32. These parts and their operation will be described in greater detail below.

Rod 12 may be included in pet toy caster 10. See FIGS. 1-3. Rod 12 may be for providing the elongated structure for casting and reeling pet toy caster 10. Rod 12 may be any standard fishing rod type device. Rod 12 may have butt end 14 and tip end 16. Rod 12 may be any desired strength rod and may be configured for the size and strength of the pet being played with. In select embodiments, rod 12 may be reinforced rod 50. Reinforced rod 50 may include a layer of reinforcing material 52 on the outside surface of rod 12. The reinforcing material 52 may be any material to aid in reinforcing or strengthening rod 12, including, but not limited to, any tapes, glues, fabrics, molds, the like, etc. Handle 86 may be included at butt end 14 of rod 12.

Reel 24 may be included in pet toy caster 10. See FIGS. 1-3. Reel 24 may be for providing a mechanism for winding up and casting line 26. Reel 24 may be any standard fishing reel, like a spin-caster reel (as shown), a spinning reel, a bait casting reel, the like, etc. Reel 24 may be mounted upon rod 12 near butt end 14. Reel 24 may be configured for casting and reeling line 26 with pet toy 32 at distal end 30 of line 26. As shown in the Figures, reel 24 may generally include spool 80, lever 82 and release mechanism 84. Spool 80 may be rotatably disposed in reel 24 and may include line 26 wrapped therearound. Lever 82 may be connected to spool 80 for turning spool 80 for reeling the line 26. Release mechanism 84 may be engageable to spool 80 for releasing spool 80 for casting. Release mechanism 84 may be a button for the spin-caster reel (as shown), or it may be a bail for a spinning reel, or a switch for a bait caster type reel, the like, etc.

Line 26 may be included in pet toy caster 10. See FIGS. 1-3. Line 26 may be for providing a fishing line type structure for casting and reeling in of pet toy 32 to and from rod 12. Line 26 may be any type, strength, size, color, etc. of a line type structure capable of casing and reeling in pet toy 32. Line 26 may be wound about reel 24, similar to a standard fishing line and reel. Line 26 may extend from reel 24 through each of the plurality of guides 18 and out of tip top guide 22. In select embodiments of the instant disclosure of pet toy caster 10, as shown in the Figures, swivel 76 may be included in line 26. Swivel 76 may be for allowing free rotation of pet toy 32 about line 26. Swivel 76 may be positioned anywhere in line 26. In select embodiments, swivel 76 may be positioned between braided section 28 and pet toy 32, or within braided section 28. In other select embodiments of the instant disclosure of pet toy caster 10, as shown in the Figures, cover 78 may be included on line 26. Cover 78 may be for protecting line 26 close to pet toy 32, i.e. in areas where the pet is likely to bite, step on, the like, etc. line 26. Cover 78 may be positioned anywhere on line 26, including, but not limited to, on line 26 between swivel 76 and pet toy 32.

Braided section 28 may be included in pet toy caster 10. See FIGS. 1-3. Braided section 28 may be for providing a visible section of line 26 approximate pet toy 32. Braided section may be at distal end 30 of line 26. Pet toy 32 may be connected to braided section 28 at distal end 30 of line 26. Braided section 28 may have thickness 34 and length 36. Thickness 34 and length 36 of braided section 28 may be configured or sized to be visible to the pet, like a dog or cat. Thickness 34 and length 36 of braided section 28 may be any desired thickness and length of braided section 28 for providing any desired visibility to the distal end 30 of line 26 next to pet toy 32, which may vary depending on the type of pet, the age of the pet, the size of the pet, etc. In select embodiments, thickness 34 of braided section 28 may be at least 0.5 inches thick. In other possibly preferred embodiments, thickness 34 of braided section 28 may be at least 1.0 inches thick. In select embodiments, length 36 of braided section 28 may be at least 10 inches long. In other possibly preferred embodiments, length 36 of braided section 28 may be between 24 inches to 30 inches long. Braided section 28 may be connected to the distal end of line 26 or it may be integral with line 26, as shown in the Figures. In select embodiments, braided section 28 may include at least 3 strands 38 of line 26 interlaced together at distal end 30 of line 26. In select embodiments, line 26 may include a ring or knot 40 positioned on line 26 prior to braided section 28 for starting braided section 28. See FIG. 2. In select embodiments, braided section 28 may be at least 100 strands 38 of line 26 interlaced together at distal end 30 of line 26. In addition to thickness 34 and length 36 of braided section 28, line 26 may be made from a highly visible color, like neons, including, but not limited to, neon orange, neon red, neon green, neon yellow, the like, etc. These visible colors of line 26, when interlaced together to make braided section 28, may provide for a highly noticeable or observable portion at distal end 30 of line 26.

Line stop 88 may be included with pet toy caster 10. See FIGS. 1-3. Line stop 88 may be for preventing braided section 28 of line 26 to be reeled into reel 24 while also allowing line 26 to freely pass through line stop 88. Line stop 88 may include a hole or slot positioned around line 26 and configured to prevent braided section 28 of line 26 to be reeled into reel 24 while allowing line 26 to freely pass through line stop 88. Line stop 88 may be positioned anywhere on rod 12, including, but not limited to, approximate reel 24 at butt end 14 of rod 12. In select embodiments, line stop 88 may be molded line stop 90 molded on rod 12 approximate reel 24. See FIGS. 1 and 3. In other select embodiments, line stop 88 may be wrapped line stop 92 that is wrapped around rod 12 approximate reel 24.

Plurality of guides 18 may be included with pet toy caster 10 on rod 12. See FIGS. 1-3. Guides 18 may be for guiding line 26 down the length of rod 12 during operation. Guides 18 may be securely attached and spaced there along rod 12. The plurality of guides 18 may include at least butt guide 20 approximate reel 24, and tip top guide 22 at tip end 16. At least one middle guide 44 may also be included between butt guide 20 and tip top guide 22. As shown in the Figures, in select embodiments the plurality of guides 18 on rod 12 may grow in size from butt guide 20 to tip top guide 22. This growth in size of guides 18 may allow for casting and reeling of braided section 28. In select embodiments, the plurality of guides 18 may be equally spaced along rod 12. As an example, and clearly not limited thereto, the guides 18 may include the butt guide 20 having diameter 42 of approximately or equal to ½ inch, middle guide 44 having diameter 46 of approximately or equal to 1 inch, and tip top guide 22 having diameter 48 of approximately or equal to 1 and ¼ inches. See FIGS. 1 and 2.

Pet toy 32 may be included with pet toy caster 10. Pet toy 32 may be any type of pet toy, including, any dog toys, cat toys, other animal toys, the like, etc. Pet toy 32 may be a stuffed animal, a rubber toy, a plastic toy, a metal toy, the like, etc. Pet toy 32 may be connected to distal end 30 of line 26 for casting and reeling in by pet toy caster 10. Pet toy 32 may be removably connected to braided section 28 at distal end 30 of line 26. In select embodiments, pet toy 32 may be removably connected via quick connectors 54. Quick connectors 54 may be for allowing quick and easy removal, changing, replacing, the like, etc. of pet toy 32 from line 26. Quick connectors 54 may be any type or size of connectors that allow for quick and easy removal, changing, replacing, the like, etc. of pet toy 32 from line 26. In select embodiments, quick connectors 54 may include male quick connection 56 and female quick connection 58. Male quick connection 56 may be attached to distal end 30 of line 26 on braided section 28, and female quick connection 58 may be attached to pet toy 32, or vice versa. Male and/or female connection 56/58 may be attached to distal end 30 of line 26 by any means, including, but not limited to, any knots, adhesives, mechanical fasteners, the like, combinations, thereof, etc. Male and/or female connection 56/58 may be attached to pet toy 32 by any means, including, but not limited to, any knots, adhesives, mechanical fasteners, sewing, string, yarn, loops, the like, combinations, thereof, etc. As an example, as shown in the figures, a section of braided section 28 may be sewn to pet toy 32 with female quick connection 58 attached thereto. Quick connectors 54 may allow for the pet toy to be interchangeable. As such, pet toy caster 10 may be used with various different pets by interchanging pet toy 32 to the desired toy of such pet. In select embodiments, quick connectors 54 may have release strength 60. See FIG. 1. Release strength 60 may be the force required to disconnect quick connectors 54, thereby releasing pet toy 32 from line 26. In select embodiments, release strength 60 of quick connectors 54 may be less than test 62 of line 26, and/or the strength of rod 12. As a result, one feature of pet toy caster 10 may be that quick connectors 54 may be configured to release pet toy 32 prior to breaking line 26 and/or rod 12.

Connector keeper 64 may also be included with pet toy caster 10. Connector keeper 64 may be for holding an extra or spare quick connector 54, including spare male connection 66 and spare female connection 68. Connector keeper 64 may be positioned anywhere on pet toy caster 10. In select embodiments, connector keeper 64 may be positioned on or approximate butt end 14 of rod 12, like on handle 86. As shown in the Figures, in select embodiments, connector keeper 64 may include hole 70 with ring clasp 72 positioned therethrough with spare male and female quick connections 66 and 68 positioned thereon ring clasp 72 via slots 74 in male and female quick connections 66 and 68. As a result, in select embodiments, spare female quick connection 68 may be configured to connect to male quick connection 56 on distal end 30 of line 26 on braided section 28, and spare male quick connection 66 may be configured to connect to female quick connection 58 on pet toy 32, or vice versa, like for storage. This storage position may prevent line 26 from getting tangled and allow for safe keeping of pet toy caster 10. In other select embodiments, spare female quick connection 68 and spare male quick connection 66 may be replacement parts for the female quick connection 58 and the male quick connection 56, if the need arises for replacement.

In operation, pet toy caster 10 may be utilized to cast pet toy 32. Pet toy caster 10 may be designed to provide the line 26 with braided section 28 that is easily seen by the pet while retrieving and playing. As a result, pet toy caster 10 may help the pet, like a dog or cat, or other small animal, see and track the pet toy 32 when casted. In addition, pet toy caster 10 may reduce or prevent the pet, like a dog or cat, or other small animal, from being tripped or becoming tangled in the casted line when retrieving the pet toy 32 and/or playing with the pet toy 32 once retrieved.

Another problem that has been addressed with pet toy caster 10 is that it has been designed to be strong enough or durable enough to be reeled back in with the pet, like for a tug of war type of game with a dog or cat. Line 26 has been provided with high test 62 and rod 12 has been provided as reinforced rod 50 with layer of reinforcing material 52 for strengthening pet toy caster 10. In addition, quick connectors 54 have been provided with release strength 60 that is less than test 62 and/or the strength of rod 12 to allow the pet toy 32 to be disconnected prior to breaking the line 26 and/or rod 12. As a result, pet toy caster 10 is designed to be durable and long lasting, thereby reducing replacement costs and downtime.

Yet another problem that has been addressed with pet toy caster 10 may be that it is designed to allow pet toy 32 to be quickly and easily removed, replaced, changed, the like, etc. Quick connectors 54 are provided at the distal end 30 of line 26 for such removing, replacing, changing, the like, etc. of pet toy 32. As such, pet toy caster 10 may be used with many different pet toys 32 for various types and sizes of pets, and may reduce the downtime required for removing, replacing, changing, the like, etc. pet toy 32.

The foregoing description and drawings comprise illustrative embodiments. Having thus described exemplary embodiments, it should be noted by those skilled in the art that the within disclosures are exemplary only, and that various other alternatives, adaptations, and modifications may be made within the scope of the present disclosure. Merely listing or numbering the steps of a method in a certain order does not constitute any limitation on the order of the steps of that method. Many modifications and other embodiments will come to mind to one skilled in the art to which this disclosure pertains having the benefit of the teachings presented in the foregoing descriptions and the associated drawings. Although specific terms may be employed herein, they are used in a generic and descriptive sense only and not for purposes of limitation. Accordingly, the present disclosure is not limited to the specific embodiments illustrated herein, but is limited only by the following claims.

What is claimed is:

1. A pet toy caster comprising:
    a rod having a butt end and a tip end;
    a reel mounted upon said rod near the butt end configured for casting and reeling a line;
    a plurality of guides securely attached and spaced therealong said rod, the plurality of guides including at least a butt guide approximate the reel, and a tip top guide at the tip end;
    said line is wound about said reel and extended through each of said plurality of guides;
    a pet toy connected to a braided section at a distal end of the line;
    wherein, the pet toy caster further including:

a swivel positioned between the braided section and the pet toy for allowing free rotation of the pet toy about the line;

a cover on the line between the swivel and the pet toy for protecting the line close to the pet toy;

said reel including a spool being rotatably disposed in said reel with a lever connected to said spool for turning said spool for reeling in, and a release mechanism engageable to said spool for releasing said spool for casting;

a handle securely disposed at the butt end of the rod; or combinations thereof.

2. The pet toy caster of claim 1, wherein said braided section having a thickness and a length being configured to be visible.

3. The pet toy caster of claim 2, wherein:
said thickness of said braided section being at least 0.5 inches thick;
said length of said braided section being at least 10 inches long; or
combinations thereof.

4. The pet toy caster of claim 3, wherein:
said thickness of said braided section being at least 1.0 inches thick;
said length of said braided section being between 24 inches to 30 inches long; or
combinations thereof.

5. The pet toy caster of claim 1, wherein said braided section being at least 3 strands of said line interlaced together at the distal end of the line, said line including a ring or knot positioned on said line prior to said braided section for starting the braided section.

6. The pet toy caster of claim 5, wherein said braided section being at least 100 strands of said line interlaced together at the distal end of the line.

7. The pet toy caster of claim 1 further comprising a line stop having a hole or a slot configured to prevent said braided section of the line to be reeled into said reel while allowing said line to freely pass through the line stop.

8. The pet toy caster of claim 7, wherein said line stop being a molded line stop molded on the rod approximate the reel or a wrapped line stop being wrapped around the rod approximate the reel.

9. The pet toy caster of claim 1, wherein said plurality of guides on said rod grow in size from said butt guide to said tip top guide.

10. The pet toy caster of claim 9, wherein said plurality of guides being equally spaced along the rod and including:
the butt guide having a diameter of approximately or equal to ½ inch;
a middle guide having a diameter of approximately or equal to 1 inch; and
the tip top guide having a diameter of approximately or equal to 1 and ¼ inches.

11. The pet toy caster of claim 1, wherein the rod being a reinforced rod including a layer of reinforcing material on an outside surface of the rod.

12. The pet toy caster of claim 1, wherein the pet toy is removably connected to the braided section of the line via quick connectors, said quick connectors including a male quick connection attached to the distal end of the line at the braided section, and a female quick connection attached to the pet toy, or vice versa,
whereby the quick connectors allowing for the pet toy to be interchangeable.

13. The pet toy caster of claim 12, wherein the quick connectors having a release strength less than a test of the line, whereby the quick connectors are configured to release the toy prior to breaking the line.

14. The pet toy caster of claim 12, wherein said butt end of the rod including a connector keeper including a spare male quick connection and a spare female quick connection, the connector keeper including a hole with a ring clasp positioned therethrough with said spare male and female quick connections positioned thereon said ring clasp via slots in said male and female quick connections, whereby:
said spare female quick connection may be configured to connect to the male quick connection on the braided section of the line and the spare male quick connection may be configured to connect to the female quick connection on the pet toy, or vice versa, for storage;
said spare female quick connection and said spare male quick connection being replacement parts for the female quick connection and the male quick connection; or
combinations thereof.

15. A pet toy caster comprising:
a rod having a butt end and a tip end;
a reel mounted upon said rod near the butt end configured for casting and reeling a line;
a plurality of guides securely attached and spaced therealong said rod, the plurality of guides including at least a butt guide approximate the reel, and a tip top guide at the tip end;
said line is wound about said reel and extended through each of said plurality of guides;
wherein said plurality of guides on said rod grow in size from said butt guide to said tip top guide;
wherein said plurality of guides being equally spaced along the rod and including:
the butt guide having a diameter of approximately or equal to ½ inch;
a middle guide having a diameter of approximately or equal to 1 inch; and
the tip top guide having a diameter of approximately or equal to 1 and ¼ inches;
wherein, the growth in size of said plurality of guides allowing casting and reeling of a braided section at a distal end of the line.

16. A pet toy caster comprising:
a rod having a butt end and a tip end;
a reel mounted upon said rod near the butt end configured for casting and reeling a line;
a plurality of guides securely attached and spaced therealong said rod, the plurality of guides including at least a butt guide approximate the reel, and a tip top guide at the tip end;
said line is wound about said reel and extended through each of said plurality of guides;
a pet toy removably connected to the braided section of the line via quick connectors, said quick connectors including a male quick connection attached to the end of the line and a female quick connection attached to the pet toy, or vice versa,
whereby the quick connectors allowing for the pet toy to be interchangeable;
wherein the quick connectors having a release strength less than a test of the line, whereby the quick connectors are configured to release the toy prior to breaking the line.

17. The pet toy caster of claim 16, wherein said butt end of the rod including a connector keeper including a spare male quick connection and a spare female quick connection, the connector keeper including a hole with a ring clasp positioned therethrough with said spare male and female quick connections positioned thereon said ring clasp via slots in said male and female quick connections, whereby:
- said spare female quick connection may be configured to connect to the male quick connection on the braided section of the line and the spare male quick connection may be configured to connect to the female quick connection on the pet toy, or vice versa, for storage;
- said spare female quick connection and said spare male quick connection being replacement parts for the female quick connection and the male quick connection; or combinations thereof.

* * * * *